(12) United States Patent
Teramura et al.

(10) Patent No.: US 6,226,588 B1
(45) Date of Patent: *May 1, 2001

(54) INFORMING APPARATUS FOR CRUISE CONTROL SYSTEM

(75) Inventors: Eiji Teramura, Okazaki; Takao Nishimura, Nagoya; Akira Isogai, Anjo; Hisanao Kato, Oobu; Norihiko Sakai, Kariya, all of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,361

(22) Filed: Oct. 14, 1999

(30) Foreign Application Priority Data

Oct. 16, 1998 (JP) .................................................. 10-295669

(51) Int. Cl.⁷ ....................................................... B60T 8/32
(52) U.S. Cl. ................................ 701/93; 701/96; 701/53; 701/301; 180/170; 123/349; 123/319; 340/425.5
(58) Field of Search .................................. 701/93, 96, 53, 701/301; 180/170; 123/349, 319; 116/62.3; 340/425.5

(56) References Cited

U.S. PATENT DOCUMENTS

| | | | |
|---|---|---|---|
| 4,208,658 | 6/1980 | Fujiki et al. ............................. | 343/7 |
| 5,695,020 | * 12/1997 | Nishimura ............................ | 180/169 |
| 5,938,714 | * 8/1999 | Satonaka .............................. | 701/96 |

FOREIGN PATENT DOCUMENTS

| | | |
|---|---|---|
| 60-161226 | 8/1985 | (JP) . |
| 62-28635 | 2/1987 | (JP) . |
| 4-102059 | 9/1992 | (JP) . |
| 8-220118 | 8/1996 | (JP) . |
| 9-52582 | 2/1997 | (JP) . |
| 10-297317 | 11/1998 | (JP) . |

OTHER PUBLICATIONS

H Winner et al, "Adaptive Cruise Control System Aspects and development Trends", Robert Bosch GmbH, International Congree & Exposition, Detroit, Michigan, Feb. 26–29, 1996.

* cited by examiner

Primary Examiner—William A. Cuchlinski, Jr.
Assistant Examiner—Olga Hernandez
(74) Attorney, Agent, or Firm—Pillsbury Winthrop LLP

(57) ABSTRACT

An informing apparatus is designed for use with a cruise control system having at least one of a function of inter-vehicle control for enabling a present vehicle to follow a preceding vehicle and a function of constant-speed travel control for enabling the present vehicle to travel at a constant speed. In the informing apparatus, a determination is made as to whether or not a main switch is in its ON position. The main switch is designed for setting a state in which the cruise control system can start to operate. A determination is made as to whether or not a set switch is in its OFF position. The set switch is designed for commanding execution of cruise control. A speed of the present vehicle and a setting lower limit vehicle speed are indicated on a contradistinction basis when it is determined that the main switch is in its ON position while the set switch is in its OFF position. The setting lower limit vehicle speed denotes a lower limit of a vehicle speed range in which the cruise control is enabled.

18 Claims, 9 Drawing Sheets

INFORMING APPARATUS FOR CRUISE CONTROL SYSTEM

BACKGROUND OF THE INVENTION

1. Field of the Invention

This invention generally relates to an informing apparatus for a vehicular cruise control system having at least one of an inter-vehicle control function and a basic cruise control function (a constant-speed travel control function). The inter-vehicle control function enables the present vehicle to automatically follow a preceding vehicle. The basic cruise control function enables the present vehicle to automatically travel at a setting speed. This invention particularly relates to an apparatus which is used together with a vehicular cruise control system, and which gives a user information related to a vehicle speed and employed in cruise control.

2. Description of the Related Art

Regarding automotive vehicles, cruise control systems have been developed as driver assistance systems. Cruise control systems include an inter-vehicle control system, a basic cruise control system (a constant-speed travel control system), and an advanced cruise control system. The advanced cruise control system has a combination of the inter-vehicle control system and the basic cruise control system (the constant-speed travel control system). The inter-vehicle control system enables the present vehicle to automatically follow a preceding vehicle at a speed in a given range. The basic cruise control system enables the present vehicle to automatically travel at a speed set by a user in a given range. During operation of the advanced cruise control system, the inter-vehicle control system can be active in the presence of a preceding vehicle while the basic cruise control system can be active in the absence of a preceding vehicle.

Such a cruise control system is allowed to start when the speed of the present vehicle is in a given range, specifically a range between a setting lower limit vehicle speed and a setting upper limit vehicle speed. It is known that the cruise control system is automatically suspended when the speed of the present vehicle drops below a lower side limit vehicle speed, that is, a lowest control-enabling vehicle speed.

In general, an advanced cruise control system is able to operate in an automatic cruise control mode. During the automatic cruise control mode of operation, change between inter-vehicle control and basic cruise control (constant-speed travel control) is automatically implemented. Specifically, during the execution of the inter-vehicle control, the speed of the present vehicle is controlled in a range lower than a setting speed, that is, a speed set by a user. In the absence of a preceding vehicle (a preceding control object), the speed of the present vehicle is increased to the setting speed and is then held equal to the setting speed by the basic cruise control.

A known means for informing a user of the transition between inter-vehicle control and basic cruise control includes a meter apparatus which indicates the presence and the absence of a preceding control object (a preceding vehicle). The information indicated by the meter apparatus makes it possible for the user to understand the reason why the speed of the present vehicle is increased in the absence of a preceding control object (a preceding vehicle).

SAE TECHNICAL PAPER SERIES 961010, "Adaptive Cruise Control System Aspects and Development Trends", discloses that a setting vehicle speed is indicated on a meter apparatus. The comparison between the setting vehicle speed and the speed of the present vehicle makes it possible to predict whether the speed of the present vehicle will be further increased or not.

Control parameters used by the inter-vehicle control system and the basic cruise control system include a setting lower limit vehicle speed, a setting upper limit vehicle speed, and a lower side limit vehicle speed (a lowest control-enabling vehicle speed). These control parameters are not displayed on an indicator although they are mentioned in a cruise control instruction manual.

A prior-art advanced cruise control system tends to give a driver the following unusual feelings ① to ⑦.

① During the execution of the inter-vehicle control, since the speed of the present vehicle is not further increased when the speed of the present vehicle has already reached a setting vehicle speed, there sometimes occurs a case where a preceding control object (a preceding vehicle) moves away from the present vehicle although the preceding control object is detected or captured in the inter-vehicle control. If the driver is not aware that the speed of the present vehicle has already reached a setting vehicle speed, the driver can not immediately understand the reason why the present vehicle is not accelerated to follow the preceding vehicle.

② During the automatic cruise control mode of operation, the inter-vehicle control is replaced by the basic cruise control when any preceding control object (any preceding vehicle) is not captured. The speed of the present vehicle will not be increased further when the speed of the present vehicle has already reached a setting vehicle speed. If the driver is not aware that the speed of the present vehicle has already reached the setting vehicle speed, the driver can not immediately understand the reason why the speed of the present vehicle is not increased. In some cases, the driver erroneously considers this phenomenon to be caused by the capture of a new preceding control object (a new preceding vehicle). In these cases, the driver feels a reduction in reliability of the control system.

③ During the automatic cruise control mode of operation, the basic cruise control is implemented when any preceding control object (any preceding vehicle) is not captured. In this case, the speed of the present vehicle can be increased to a setting vehicle speed. If the driver does not understand the relation between the speed of the present vehicle and the setting vehicle speed, the driver tends to wonder what speed the present vehicle will be accelerated to.

④ Regarding either the inter-vehicle control or the basic cruise control, a setting vehicle speed can not be given unless the speed of the present vehicle is equal to or higher than the setting lower limit vehicle speed. If the driver does not understand this fact and tries to give a setting vehicle speed when the speed of the present vehicle is lower than the setting lower limit vehicle speed, the driver wonders why the setting vehicle speed can not be given.

⑤ The inter-vehicle control is automatically canceled when the speed of the present vehicle drops below the lower side limit vehicle speed (the lowest control-enabling vehicle speed). If the driver is not aware that the inter-vehicle control has been canceled, the driver tends to think why the present vehicle does not follow a preceding vehicle (a preceding control object). If the driver does not understand the lower side limit vehicle speed (the lowest control-enabling vehicle speed), the driver tends to be anxious about how much drop in the speed of the present vehicle will cause the cancel of the inter-vehicle control.

⑥ During the execution of either the inter-vehicle control or the basic cruise control, if the driver is not aware that the speed of the present vehicle has already reached the setting upper limit vehicle speed, the driver may try to increase a setting vehicle speed.

⑦ In the case where a target control amount is small, a variation in behavior of the present vehicle is also small while a meter indicating the speed of the present vehicle only slightly moves. In this case, it is sometimes difficult for the driver to decide whether the control system is operating normally. Thus, the driver may feel uneasy about the control system.

The causes of these problems are as follows. A prior-art meter indicator displays information of the speed of the present vehicle, information of a setting vehicle speed, and information of the presence and the absence of a preceding control objet (a preceding vehicle). In general, the prior-art meter indicator does not display information related to vehicle speeds such as a setting lower limit vehicle speed, a setting upper limit vehicle speed, and a lower side limit vehicle speed (a lowest control-enabling vehicle speed). The setting lower limit vehicle speed, the setting upper limit vehicle speed, and the lower side limit vehicle speed (the lowest control-enabling vehicle speed) are mentioned in a cruise control instruction manual. Thus, a user is required to understand states of inter-vehicle control and basic cruise control in consideration of a lot of information.

The behavior of the present vehicle dynamically changes in response to a variation in environments surrounding the vehicle. The cause of a change in the behavior of the vehicle can be known by looking at a meter indicator. It is troublesome for a driver to look at a meter indicator each time a change in the behavior of the vehicle occurs. Also, it is troublesome for the driver to previously memorize vehicle speed information which is not displayed on the meter indicator. In some cases, driver's judgment based on a scene in front of the driver is inconsistent with a change in the behavior of the vehicle. Such an inconsistency may cause the driver to make a wrong decision.

The causes of the previously-mentioned driver's unusual feelings are that pieces of much information exist in different forms respectively.

SUMMARY OF THE INVENTION

It is an object of this invention to provide an informing apparatus for a vehicular cruise control system which is designed so that vehicle-speed-related information used in cruise control can be given to a user (a vehicle driver) while being related to the speed of the present vehicle. This designing enables the user to easily understand the state of the control system.

A first aspect of this invention provides an informing apparatus for a cruise control system having at least one of a function of inter-vehicle control for enabling a present vehicle to follow a preceding vehicle and a function of constant-speed travel control for enabling the present vehicle to travel at a constant speed. The informing apparatus comprises first means for determining whether or not a main switch is in its ON position, the main switch being for setting a state in which the cruise control system can start to operate; second means for determining whether or not a set switch is in its OFF position, the set switch being for commanding execution of cruise control; and third means for indicating a speed of the present vehicle and a setting lower limit vehicle speed on a contradistinction basis when it is determined that the main switch is in its ON position while the set switch is in its OFF position, the setting lower limit vehicle speed denoting a lower limit of a vehicle speed range in which the cruise control is enabled.

A second aspect of this invention provides an informing apparatus for a cruise control system having a function of constant-speed travel control for enabling a present vehicle to travel at a constant speed. The informing apparatus comprises first means for determining whether or not a setting vehicle speed for the constant-speed travel control is provided; second means for determining whether or not the constant-speed travel control is executed; and third means for indicating a difference between a speed of the present vehicle and the setting vehicle speed as a two-dimensional region when it is determined that the setting vehicle speed is provided and the constant-speed travel control is executed.

A third aspect of this invention provides an informing apparatus for a cruise control system having a function of constant-speed travel control for enabling a present vehicle to travel at a constant speed. The informing apparatus comprises first means for determining whether or not a setting vehicle speed for the constant-speed travel control is provided; second means for determining whether or not the constant-speed travel control is executed; and third means for indicating the setting vehicle speed and a setting upper limit vehicle speed on a contradistinction basis when it is determined that the setting vehicle speed is provided and the constant-speed travel control is executed, the setting upper limit vehicle speed denoting an upper limit of a vehicle speed range in which the constant-speed travel control is enabled.

A fourth aspect of this invention provides an informing apparatus for a cruise control system having at least one of a function of inter-vehicle control for enabling a present vehicle to follow a preceding vehicle and a function of constant-speed travel control for enabling the present vehicle to travel at a constant speed. The informing apparatus comprises first means for determining whether or not cruise control is executed; and second means for indicating a speed of the present vehicle and a lower side limit vehicle speed on a contradistinction basis when it is determined that the cruise control is executed, the lower side limit vehicle speed denoting a lower limit speed for automatically suspending the cruise control.

A fifth aspect of this invention provides an informing apparatus for a cruise control system having at least one of a function of inter-vehicle control for enabling a present vehicle to follow a preceding vehicle and a function of constant-speed travel control for enabling the present vehicle to travel at a constant speed. The informing apparatus comprises first means for determining whether or not cruise control is executed; and second means for indicating a setting vehicle speed and a lower side limit vehicle speed on a contradistinction basis when it is determined that the cruise control is executed, the setting vehicle speed being for the constant-speed travel control, the lower side limit vehicle speed denoting a lower limit speed for automatically suspending the cruise control.

A sixth aspect of this invention provides an informing apparatus for a cruise control system having a function of inter-vehicle control for enabling a present vehicle to follow a preceding vehicle. The informing apparatus comprises first means for determining whether or not the inter-vehicle control is executed; and second means for indicating a degree of a target control amount for the inter-vehicle control in a form corresponding to a speed of the present vehicle when it is determined that the inter-vehicle control is executed.

A seventh aspect of this invention is based on the first aspect thereof, and provides an informing apparatus wherein the cruise control system executes the inter-vehicle control in the presence of a preceding vehicle being a control object, and executes the constant-speed travel control in the absence of a preceding vehicle being a control object.

An eighth aspect of this invention is based on the second aspect thereof, and provides an informing apparatus further comprising means for visually or audibly informing when the speed of the present vehicle becomes equal to the setting vehicle speed or when the speed of the present vehicle is equal to the setting vehicle speed.

A ninth aspect of this invention is based on the eighth aspect thereof, and provides an informing apparatus further comprising means for varying the setting vehicle speed in response to changing operation by a user, and means for visually or audibly informing when the setting vehicle speed reaches a setting upper limit vehicle speed, the setting upper limit speed being an upper limit of a vehicle speed range in which cruise control is enabled.

A tenth aspect of this invention is based on the second aspect thereof, and provides an informing apparatus further comprising means for deriving information of a limit vehicle speed, means for indicating the limit vehicle speed information and the speed of the present vehicle on a contradistinction basis before cruise control is started, and means for indicating the limit vehicle speed information, the speed of the present vehicle, and the setting vehicle speed on a contradistinction basis after cruise control has been started.

An eleventh aspect of this invention is based on the tenth aspect thereof, and provides an informing apparatus further comprising means for obtaining the limit vehicle speed information from a navigation system.

A twelfth aspect of this invention is based on the fourth aspect thereof, and provides an informing apparatus further comprising means for visually or audibly informing when the speed of the present vehicle becomes equal to the lower side limit vehicle speed.

A thirteenth aspect of this invention is based on the first aspect thereof, and provides an informing apparatus further comprising means for indicating a difference between the setting lower limit vehicle speed and the speed of the present vehicle as a two-dimensional region.

A fourteenth aspect of this invention is based on the third aspect thereof, and provides an informing apparatus further comprising means for indicating a difference between the setting vehicle speed and the setting upper limit vehicle speed as a two-dimensional region.

A fifteenth aspect of this invention is based on the fourth aspect thereof, and provides an informing apparatus further comprising means for indicating a difference between the lower side limit vehicle speed and the speed of the present vehicle as a two-dimensional region.

A sixteenth aspect of this invention is based on the fifth aspect thereof, and provides an informing apparatus further comprising means for indicating a difference between the setting vehicle speed and the lower side limit vehicle speed as a two-dimensional region.

A seventeenth aspect of this invention is based on the second aspect thereof, and provides an informing apparatus further comprising means for generating a sound or a train of pulses of sound when it is determined that the setting vehicle speed is provided and the constant-speed travel control is executed, wherein the generated sound has a sound pressure which varies stepwise as a function of the difference between the setting vehicle speed and the speed of the present vehicle, and the train of pulses of sound has a duty cycle which varies stepwise as a function of the difference between the setting vehicle speed and the speed of the present vehicle.

An eighteenth aspect of this invention is based on the first aspect thereof, and provides an informing apparatus further comprising means for visually or audibly informing when it is determined that at least one of the main switch and the set switch is changed to its ON position.

DESCRIPTION OF THE PREFERRED EMBODIMENTS

First Embodiment

Figure 1:
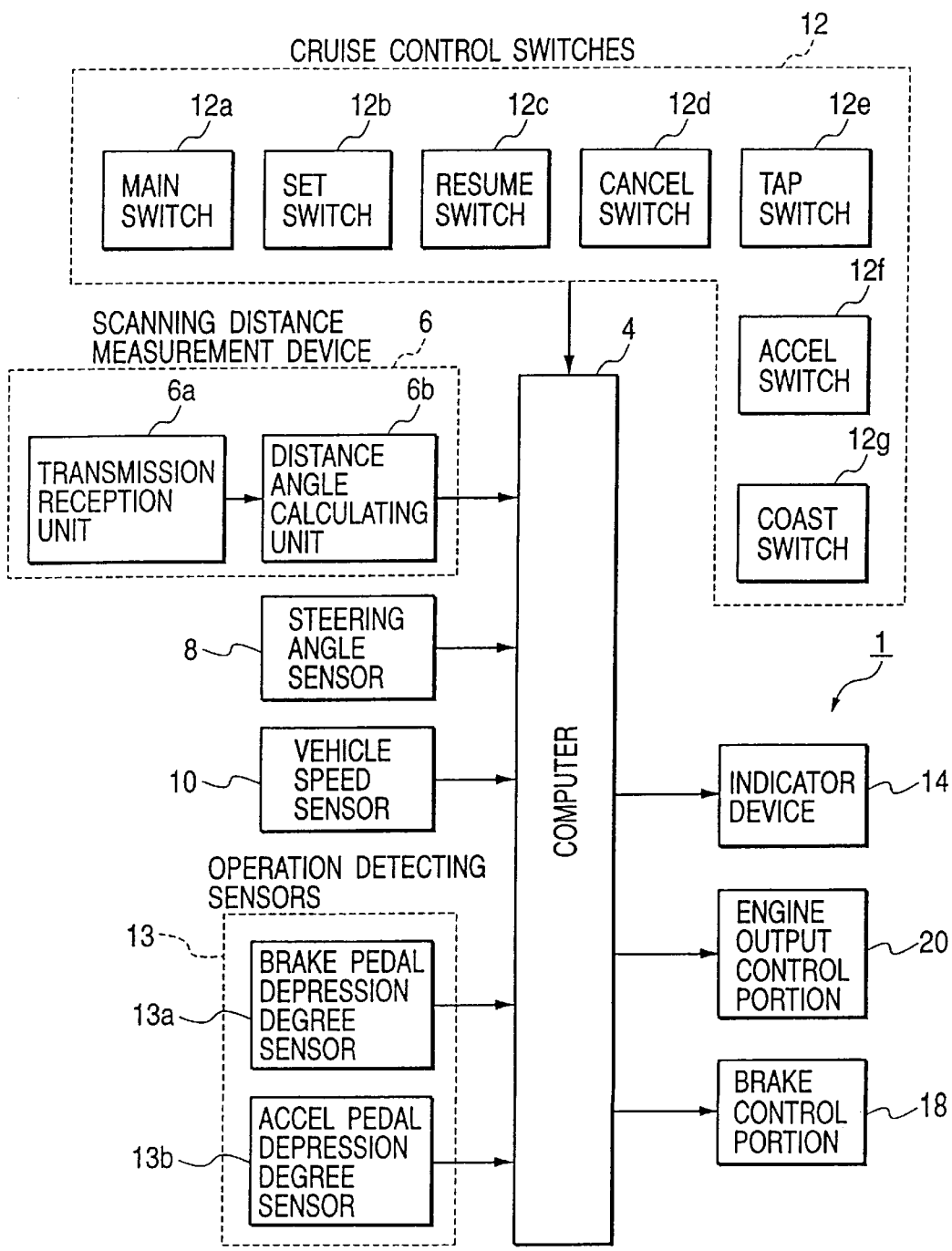
FIG. 1 is a block diagram of an automatic cruise control system for a vehicle which includes an informing apparatus according to an embodiment of this invention.

FIG. 1 shows an automatic cruise control system 1 for a vehicle which includes an informing apparatus according to a first embodiment of this invention. The automatic cruise control system 1 is designed so that basic cruise control (constant-speed travel control) can be implemented in the absence of a preceding vehicle with respect to the present vehicle, and inter-vehicle control can be implemented when a preceding vehicle is detected or captured. The basic cruise control function enables the present vehicle to automatically travel at a setting speed. The inter-vehicle control function enables the present vehicle to automatically follow a preceding vehicle and simultaneously keep a safe distance with respect thereto.

The automatic cruise control system 1 includes a computer 4 as a main component. The automatic cruise control system 1 further includes a scanning distance measurement device 6, a steering angle sensor 8, a vehicle speed sensor 10, cruise control switches 12, operation detecting sensors 13, an indicator device or a display device 14, a brake control portion 18, and an engine output control portion 20 which are connected to the computer 4. The sensors 13 act to detect operation by a vehicle driver.

The computer 4 has a combination of an input/output (I/O) interface, a CPU, a ROM, and a RAM. The I/O interface includes drive circuits and detection circuits. The computer 4 operates in accordance with a program stored in the ROM.

The scanning distance measurement device 6 includes a transmission/reception unit 6a and a distance/angle calculating unit 6b. The transmission/reception unit 6a emits a beam of laser light in a forward direction with respect to the present vehicle. An area in front of the present vehicle is periodically scanned by the laser light beam. The transmission/reception unit 6a acts to detect an echo light beam caused by reflection of the laser light beam at a preceding object (a preceding vehicle). The transmission/reception unit 6a also detects the direction of the echo light beam. The transmission/reception unit 6a informs the distance/angle calculating portion 6b of the detection of the echo light beam and the direction of the echo light beam. The distance/angle calculating unit 6b calculates the relative speed of the preceding object, the distance thereto, and the position (the positional coordinates) thereof on the basis of the time interval between the moment of the emission of the laser light beam and the moment of the detection of the related echo light beam, and the direction of the echo light beam. The distance/angle calculating unit 6b informs the computer 4 of the calculation results.

The scanning distance measurement device 6 may be replaced by a distance measurement device using a radio wave beam, a microwave beam, or an ultrasonic beam.

The steering angle sensor 8 detects the amount or degree of change in the angle of a steering wheel in the present vehicle. The steering angle sensor 8 detects the relative steering angle from the detected change amount or degree. The steering angle sensor 8 informs the computer 4 of the detected relative steering angle.

When the automatic cruise control system 1 is started to operate, a signal representing "0" is initially set in a segment of a memory which has a steering angle storage address. The signal in this segment of the memory is used as an indication of the steering angle. Thereafter, the steering angle signal is updated. Specifically, a mean value of the detected steering angle which occurs during travel of the present vehicle is periodically calculated, and an offset of the steering angle from the neutral-position-corresponding value is periodically corrected in response to the calculated mean value. In addition, the relative steering angle is determined by accumulation of the detected amount or degree of change in the steering angle. Curve data related to turning conditions of the present vehicle can be generated on the basis of the relative steering angle. The curve data represents the direction and the radius of turn of the present vehicle. The curve data is used in a decision regarding whether a preceding vehicle detected by the scanning distance measurement device 6 is an object for the inter-vehicle control. Specifically, when the present vehicle is turning to the right, a captured preceding vehicle in the left side of the center of the scanned area is determined to be travelling on an unrelated lane, and is therefore excluded from an object for the inter-vehicle control. On the other hand, a captured preceding vehicle in the right side of the center of the scanned area is determined to be an object for the inter-vehicle control. Thus, the curve data is used in determining the direction of travel of the present vehicle, and also in identifying a preceding vehicle.

The vehicle speed sensor 10 detects the rotational speed of vehicle wheels as an indication of the speed of the body of the present vehicle. The vehicle speed sensor 10 informs the computer 4 of the detected speed of the present vehicle.

The operation detecting sensors 13 detect manual operation by the vehicle driver. The operation detecting sensors 13 include a brake pedal depression degree sensor 13a and an accelerator pedal depression degree sensor 13b. The sensor 13a detects the degree of depression of a brake pedal by the driver. The sensor 13a informs the computer 4 of the detected degree of depression of the brake pedal. On the other hand, the sensor 13b detects the degree of depression of an accelerator pedal. The sensor 13b informs the computer 4 of the detected degree of depression of the accelerator pedal. In the case where the present vehicle has a manual transmission, the operation detecting sensors 13 further include switches for detecting shift-up and shift-down of the manual transmission.

The cruise control switches 12 include a main switch 12a, a set switch 12b, a resume switch 12c, a cancel switch 12d, a tap switch 12e, an accelerator switch 12f, and a coast switch 12g. These switches 12a–12g inform the computer 4 of their positions or states. The computer 4 uses and processes the information pieces fed from the switches 12a–12g. The functions of these switches 12a–12g, and the related processing by the computer 4 are as follows.

The main switch 12a is used for providing a state where cruise control can be started. When the main switch 12a is changed to its ON position, the basic cruise control (the constant-speed travel control) can be started. During the execution of the basic cruise control, a process for the inter-vehicle control is implemented.

When the set switch 12b is actuated, the current speed Vn of the present vehicle is sampled and held. In addition, the sampled and held vehicle speed Vn is set as a target vehicle speed (a setting vehicle speed) Vm, and the basic cruise control responsive to the target vehicle speed Vm is started.

In the case where the cruise control is canceled while the target vehicle speed Vm is held, when the resume switch 12c is actuated, the speed of the present vehicle is returned to the target vehicle speed Vm.

When the cancel switch 12d is actuated, the basic cruise control is suspended.

The tap switch 12e is used in setting a target inter-vehicle distance, that is, a target distance between the present vehicle and a preceding vehicle.

When the accelerator switch 12f is actuated, the held setting vehicle speed (the held target vehicle speed) Vm is gradually increased.

When the coast switch 12g is actuated, the held setting vehicle speed (the held target vehicle speed) Vm is gradually decreased.

The indicator device 14 corresponds to the informing apparatus according to the first embodiment of this invention. The indicator device 14 includes a meter indicator which can display a combination of the speed of the present vehicle and at least one of the setting vehicle speed, the setting lower limit vehicle speed, the setting upper limit vehicle speed, and the lower side limit vehicle speed (the lowest control-enabling vehicle speed) in a same indicator region on a contradistinction basis. Preferably, the indicator device 14 further includes a sound or voice generator.

In the case where the present vehicle is powered by a spark-ignition internal combustion engine, the engine output control portion 20 adjusts the degree of opening of an engine throttle valve in response to a command from the computer 4. The adjustment of the throttle valve results in control of the power output of the engine, and thus control of the speed of the present vehicle. In the case where the present vehicle is powered by a diesel internal combustion engine, the engine output control portion 20 adjusts the position of a control rack in a fuel injection pump in response to a command from the computer 4. The adjustment of the control rack results in control of the power output of the engine, and thus control of the speed of the present vehicle.

It should be noted that the engine output control portion 20 may select a gear position of an automatic transmission to adjust the power output of the engine.

The brake control portion 18 adjusts the pressures (the braking pressures) applied to the wheel cylinders for the respective vehicle wheels in response to a command from the computer 4. Alternatively, the brake control portion 18 may use an exhaust brake or another retarding device.

The computer 4 drives and adjusts the indicator device 14, the brake control portion 18, and the engine output control portion 20 in response to information pieces given by the scanning distance measurement device 6, the steering angle sensor 8, the vehicle speed sensor 10, the cruise control switches 12, and the operation detecting sensors 13.

As previously mentioned, the computer 4 has a combination of an input/output (I/O) interface, a CPU, a ROM, and a RAM. When a power supply switch (not shown) is changed to its ON position, the computer 4 starts to be fed with electric power and hence commences to operate. The computer 4 operates in accordance with a program stored in the ROM. The computer 4 executes a process as an inter-vehicle control apparatus, and also a process as a basic cruise control apparatus (a constant-speed travel control apparatus).

Figure 2:
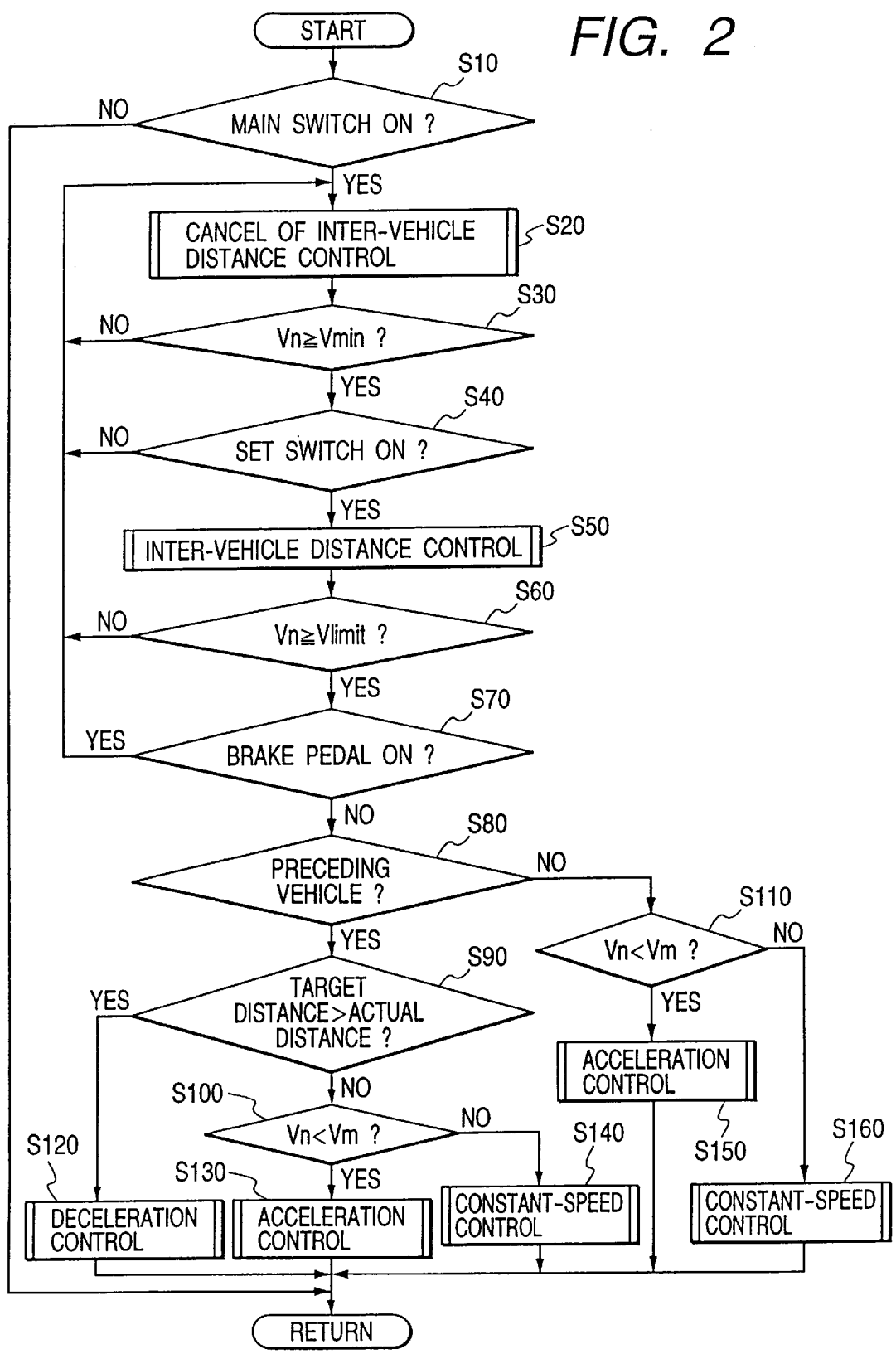
FIG. 2 is a flowchart of a segment of a program for a computer in FIG. 1.

FIG. 2 is a flowchart of a segment of the program which relates to inter-vehicle distance control and basic cruise control (constant-speed travel control). The program segment in FIG. 2 is iteratively executed by, for example, a timer-based interruption process.

As shown in FIG. 2, a first step S10 of the program segment determines whether or not the main switch 12a among the cruise control switches 12 is in its ON position. When the main switch 12a is in its ON position, the program advances from the step S10 to a block S20. Otherwise, the program exits from the step S10 and returns to a main routine so that the current execution cycle of the program segment ends.

The block S20 sets or holds the inter-vehicle distance control in its canceled state. Thus, the execution of the step S20 means a condition which occurs before the inter-vehicle distance control is started. After the block S20, the program advances to a step S30.

The step S30 compares the speed Vn of the present vehicle and the setting lower limit vehicle speed Vmin. When the speed Vn of the present vehicle is equal to or higher than the setting lower limit vehicle speed Vmin, the program advances from the step S30 to a step S40. Otherwise, the program returns from the step S30 to the block S20.

The step S40 determines whether or not the set switch 12b among the cruise control switches 12 is in its ON position. When the set switch 12b is in its ON position, the program advances from the step S40 to a block S50. Otherwise, the program returns from the step S40 to the block S20.

The block S50 starts the inter-vehicle distance control. After the block S50, the program advances to a step S60.

The step S60 compares the speed Vn of the present vehicle and the lower side limit vehicle speed (the lowest control-enabling vehicle speed) Vlimit. When the speed Vn of the present vehicle is equal to or higher than the lower side limit vehicle speed Vlimit, the program advances from the step S60 to a step S70. Otherwise, the program returns from the step S60 to the block S20.

The step S70 determines whether or not the brake pedal is depressed by referring to the output signal of the brake pedal depression degree sensor 13a. When the brake pedal is depressed, the program returns from the step S70 to the step S20. Otherwise, the program advances from the step S70 to a step S80.

The step S80 determines whether or not a preceding vehicle exists by referring to the information fed from the scanning distance measurement device 6 and also the information fed from the steering angle sensor 8. When a preceding vehicle exists, the program advances from the step S80 to a step S90. Otherwise, the program advances from the step S80 to a step S110.

The step S90 derives the actual inter-vehicle distance from the information given by the scanning distance measurement device 6. The actual inter-vehicle distance means the actual distance between the present vehicle and the preceding vehicle. The step S90 compares the actual inter-vehicle distance and a target inter-vehicle distance. When the target inter-vehicle distance is greater than the actual inter-vehicle distance, the program advances from the step S90 to a block S120. Otherwise, the program advances from the step S90 to a step S100.

The step S100 compares the speed Vn of the present vehicle and the setting vehicle speed Vm. When the speed Vn of the present vehicle is lower than the setting vehicle speed Vm, the program advances from the step S100 to a step S130. Otherwise, the program advances from the step S100 to a step S140.

The block S120 adjusts at least one of the brake control portion 18 and the engine output control portion 20 to decelerate the present vehicle and thereby increase the actual inter-vehicle distance. Thus, the block S120 implements deceleration control. After the block S120, the current execution cycle of the program segment ends and the program returns to the main routine.

The block S130 adjusts the engine output control portion 20 to accelerate the present vehicle and thereby decrease the actual inter-vehicle distance. Thus, the block S130 implements acceleration control. After the block S130, the current execution cycle of the program segment ends and the program returns to the main routine.

The block S140 adjusts at least one of the brake control portion 18 and the engine output control portion 20 to drive the present vehicle at a constant speed equal to the setting vehicle speed Vm. Thus, the block S140 implements constant-speed control. After the block S140, the current execution cycle of the program segment ends and the program returns to the main routine.

The step S110 compares the speed Vn of the present vehicle and the setting vehicle speed Vm. When the speed Vn of the present vehicle is lower than the setting vehicle speed Vm, the program advances from the step SI 10 to a step S150. Otherwise, the program advances from the step S10 to a step S160.

The block S150 adjusts the engine output control portion 20 to accelerate the present vehicle toward the setting vehicle speed Vm. Thus, the block S150 implements acceleration control. After the block S150, the current execution cycle of the program segment ends and the program returns to the main routine.

The block S160 adjusts at least one of the brake control portion 18 and the engine output control portion 20 to drive the present vehicle at a constant speed equal to the setting vehicle speed Vm. The block S160 implements constant-speed control. After the block S160, the current execution cycle of the program segment ends and the program returns to the main routine.

During the execution of the program segment in FIG. 2, that is, during the execution of the inter-vehicle distance control and the basic cruise control (the constant-speed travel control), the computer 4 controls the indicator device 14. According to the control by the computer 4, the indicator device 14 displays a combination of the speed Vn of the present vehicle and at least one of the setting vehicle speed Vm, the setting lower limit vehicle speed Vmin, the setting upper limit vehicle speed Vmax, and the lower side limit vehicle speed (the lowest control-enabling vehicle speed) Vlimit in a same indicator region on a contradistinction basis. This display form makes it easier for the driver (the user) to understand and predict transitions in conditions of the cruise control.

Figure 3:
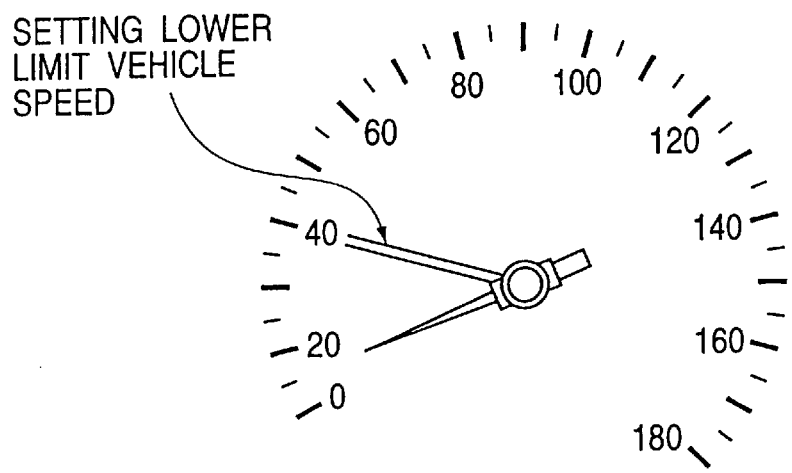
FIGS. 3 to 16 are plan views of different conditions of the front surface of an indicator device in FIG. 1, respectively.

FIG. 3 shows a condition of the front surface of the indicator device 14 which occurs before the set switch 12b is changed to its ON position in the case where the main switch 12a has already been in its ON position. As shown in FIG. 3, the front surface of the indicator device 14 has a circular shape. The indicator device 14 has a mechanical pointer which can rotate about the center of the circular front surface. The indicator device 14 has an array of marks representing different speed values and circumferentially extending on the circular front surface. The pointer can be directed to an arbitrary point within the speed mark array. The pointer is moved in accordance with the control by the computer 4. The circular front surface is formed by the screen of a two-dimensional display such as an EL display, a CRT, a liquid crystal display, an array of LED's, or an array of lamps. Arbitrary pictures can be displayed on the circular front surface in accordance with the control by the computer 4. Specifically, a movable indication bar can be displayed on the circular front surface. In addition, arbitrary sectorial regions can be displayed on the circular front surface.

With reference to FIG. 3, a pointer denotes the speed Vn of the present vehicle, and an indication bar pointing to a speed of 40 km/h denotes the setting lower limit vehicle speed Vmin. According to the condition of the indicator device 14 in FIG. 3, it is easy to understand whether or not the speed Vn of the present vehicle exceeds the setting lower limit vehicle speed Vmin.

In addition, it is easy to predict, from motion of the pointer the present-vehicle-speed pointer), a timing at which the speed Vn of the present vehicle will exceed the setting lower limit vehicle speed Vmin during vehicle acceleration responsive to depression of the accelerator pedal. Accordingly, it is unnecessary to confirm the displayed information on the indicator device 14 many times and to repeat operation of the set switch 12b when the speed Vn of the present vehicle is around 40 km/h.

The region corresponding to the difference between the setting lower limit vehicle speed Vmin and the speed Vn of the present vehicle may be positively indicated. In this case, it is easy to understand the size of a range in which the speed Vn of the present vehicle can be controlled with respect to the setting vehicle speed Vm.

Figure 4:
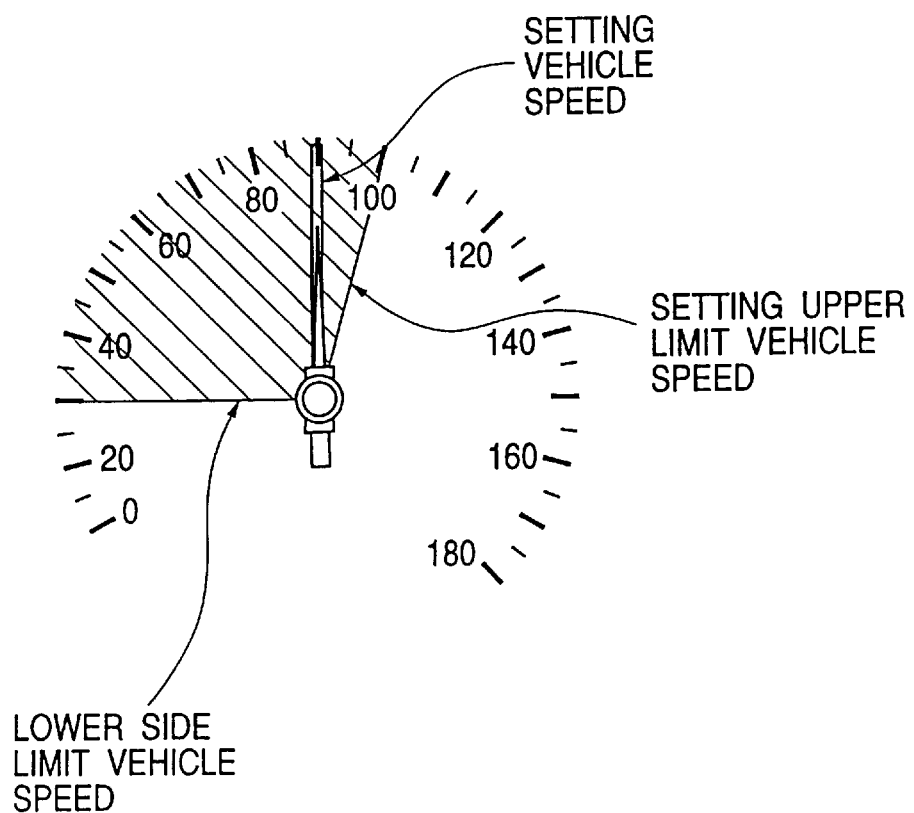

FIG. 4 shows a condition of the front surface of the indicator device 14 which occurs immediately after the set switch 12b is changed to its ON position. When the set switch 12b is changed to its ON position, the computer 4 samples and holds the speed Vn of the present vehicle as a setting vehicle speed Vm. In FIG. 4, an indication bar pointing to a speed of 90 km/h denotes the setting vehicle speed Vm rather than the setting lower limit vehicle speed Vmin. According to the condition of the indicator device 14 in FIG. 4, it is easy to understand the relation between the speed Vn of the present vehicle and the setting vehicle speed Vm.

Figure 5:
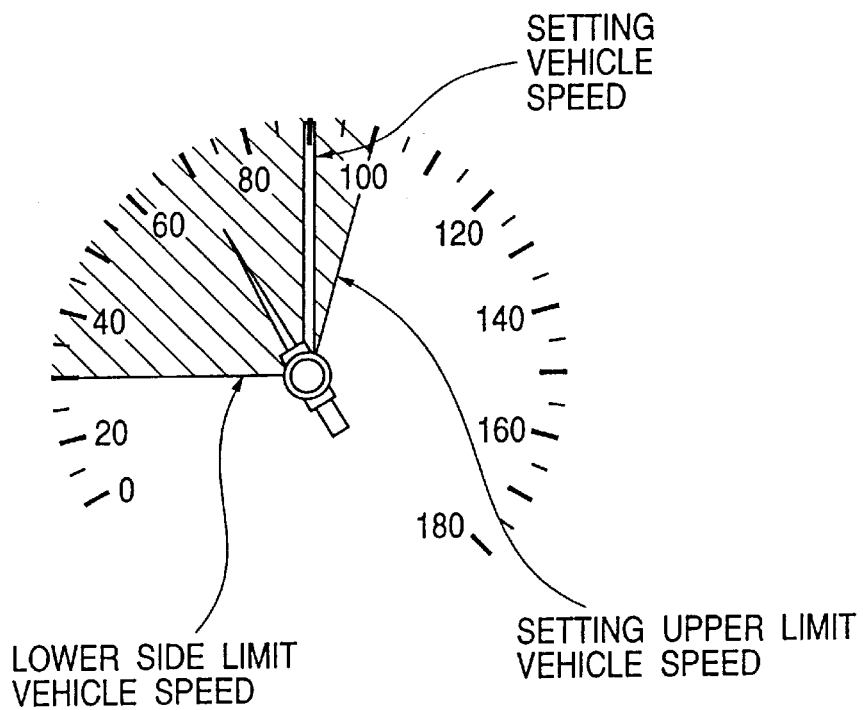

FIG. 5 shows a condition of the front surface of the indicator device 14 which occurs when the present vehicle is decelerated to properly follow a preceding vehicle during the execution of the inter-vehicle distance control. The condition of the indicator device 14 in FIG. 5 shows that the setting vehicle speed Vm is equal to 90 km/h while the speed Vn of the present vehicle is equal to 70 km/h. In this case, if the preceding vehicle disappears, the speed Vn of the present vehicle will be increased toward the setting vehicle speed Vm. The driver (the user) can easily understand what speed range the speed Vn of the present vehicle will be increased by since it is denoted by the positional difference between the pointer and the indication bar.

In the case where the present vehicle is accelerated to properly follow the preceding vehicle and then the speed Vn of the present vehicle reaches the setting vehicle speed Vm, the present vehicle will not be accelerated further. This state can easily be understood by the driver (the user) since the positional difference between the pointer and the indication bar is nullified as shown in FIG. 4. In the absence of a preceding vehicle, when the pointer and the indication bar overlap each other, it is easily understand the occurrence of change from the acceleration control to the constant-speed control. In addition, it is easy to predict a timing at which the pointer and the indication bar will overlap each other, that is, a timing at which the acceleration control will be replaced by the constant-speed control.

Preferably, the computer 4 controls the indicator device 14 to visually or audibly inform that the speed Vn of the present vehicle becomes or remains equal to the setting vehicle speed Vm. In this case, the user (the driver) can more clearly understand that the speed Vn of the present vehicle will not be further increased. From the condition of the indicator device 14 in which the pointer and the indication bar overlap each other as shown in FIG. 4, the user (the driver) can indirectly understand that the speed Vn of the present vehicle will not be further increased. In addition, as previously mentioned, the indicator device 14 visually or audibly informs that the speed Vn of the present vehicle becomes or remains equal to the setting vehicle speed Vm. Therefore, the user (the driver) can directly understand that the speed Vn of the present vehicle will not be further increased. The above-mentioned visually informing is implemented by activating or periodically turning on and off a lamp in the indicator device 14. The visually informing may be implemented by indicating a letter, a character, letters, or characters. Alternatively, the visually informing may be implemented by intermittently activating or illuminating the indication bar which denotes the setting vehicle speed Vm. The above-mentioned audibly informing is implemented by generating buzzer sound of a given tone, or a guidance voice message.

Figure 6:
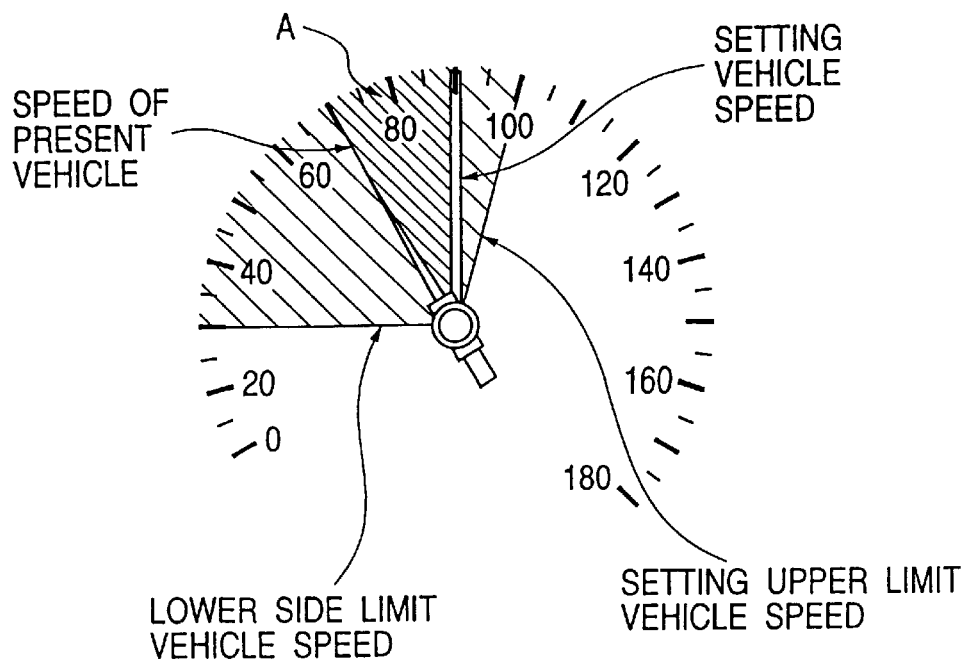

FIG. 6 shows a condition of the front surface of the indicator device 14 in which the sectorial region "A" corresponding to the positional difference between the pointer and the indication bar is positively indicated in such a way as to be visually distinguished from other regions. In FIG. 6, the speed Vn of the present vehicle which is denoted by the pointer is equal to 70 km/h, and the setting vehicle speed Vm denoted by the indication bar is equal to 90 km/h.

The sectorial region "A" is different from other regions in color or brightness. Since the positional difference between the pointer and the indication bar is expressed by the area or size of the sectorial region "A", it is easy to understand the relation between the speed Vn of the present vehicle and the setting vehicle speed Vm. In addition, it is easy to understand what speed range the speed Vn of the present vehicle can be increased by.

Figure 7:
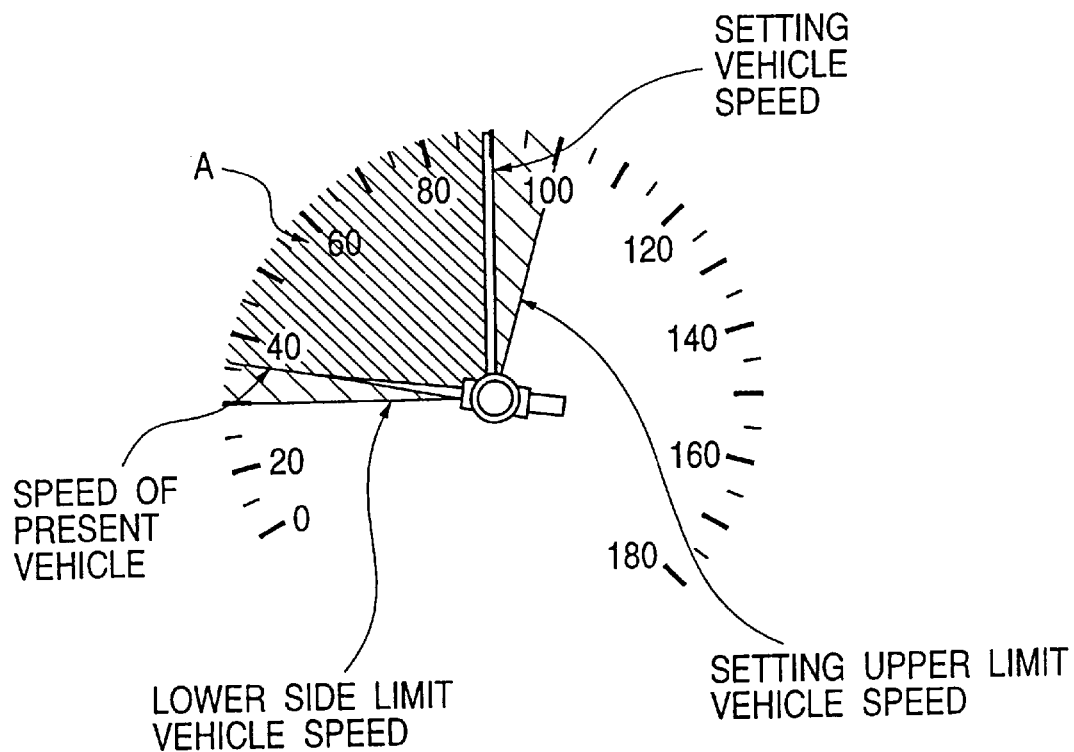

In the case where the sectorial region "A" is expanding from the condition of FIG. 6 to the condition of FIG. 7, the user (the driver) can easily understand a greater potential of increase in the speed Vn of the present vehicle.

It should be noted that the difference between the speed Vn of the present vehicle and the setting vehicle speed Vm may be indicated as a region in another display way.

With reference back to FIG. 4, during the execution of the inter-vehicle distance control, the region in which the speed Vn of the present vehicle can be controlled is positively indicated as a sectorial region extending between a line corresponding to the lower side limit vehicle speed Vlimit (30 km/h) and a line corresponding to the setting upper limit vehicle speed Vmax (100 km/h). Specifically, this sectorial region is different from other regions in color or brightness.

According to the condition of the indicator device 14 in FIG. 7, it is easy to estimate what speed drop will cause the speed Vn of the present vehicle to decrease below the lower side limit vehicle speed Vlimit, and hence will cancel the inter-vehicle distance control.

Figure 16:
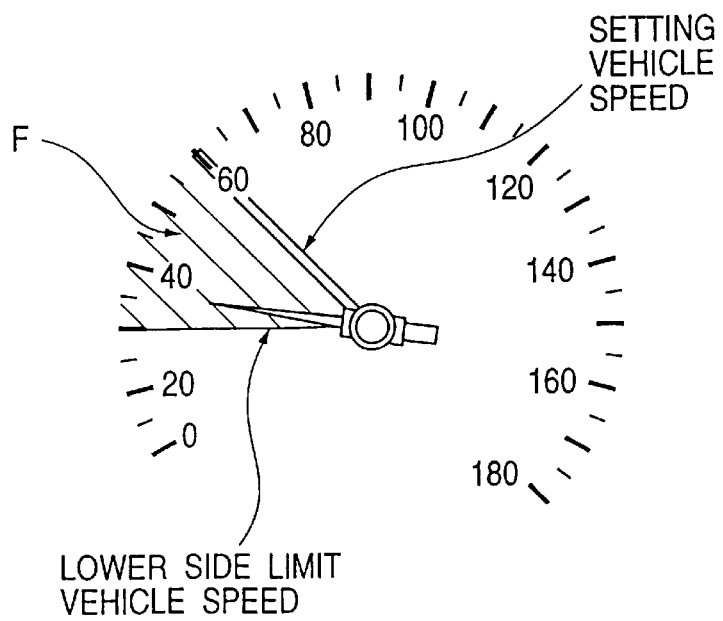

FIG. 4 shows a merit provided by the designing where the lower side limit vehicle speed (the lowest control-enabling vehicle speed) Vlimit and the setting vehicle speed Vm are simultaneously displayed on the indictor device 14. With reference to FIG. 16, the difference between the lower side limit vehicle speed Vlimit and the setting vehicle speed Vm is denoted by a positively-indicated sectorial region "F". According to the condition of the indicator device 14 in FIG. 16, it is easy to grasp a range in which the speed Vn of the present vehicle can be controlled.

Figure 8:
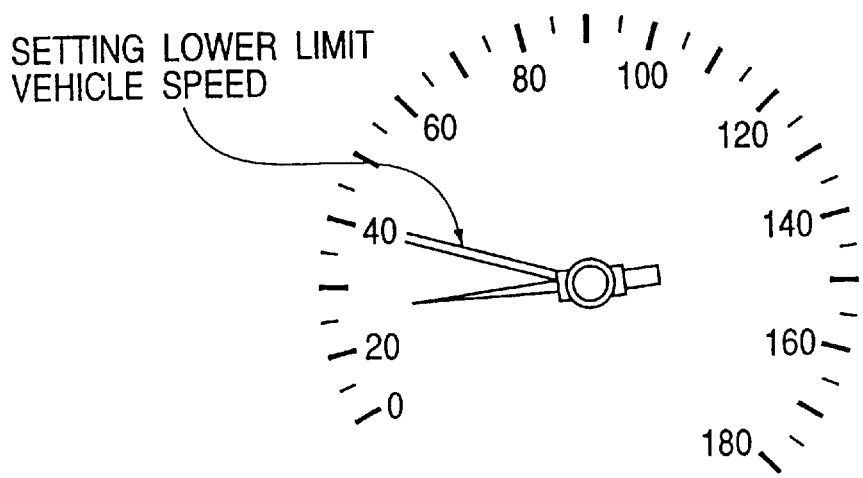

FIG. 8 shows a condition of the front surface of the indicator device 14 which occurs immediately after the inter-vehicle distance control is canceled since the speed Vn of the present vehicle drops below the lower side limit vehicle speed (the lowest control-enabling vehicle speed) Vlimit. In this case, the positively-indicated sectorial region disappears which corresponds to the control region. In FIG. 8, the indication bar denotes the setting lower limit vehicle speed Vmin rather than the setting vehicle speed Vm.

Accordingly, it is easy to understand the cancel of the inter-vehicle distance control. The condition of the indicator 14 in FIG. 8 is similar to that in FIG. 3. Thus, in FIG. 8, the setting lower limit vehicle speed Vmin and the speed Vn of the present vehicle are simultaneously displayed.

Preferably, the computer 4 controls the indicator device 14 to visually or audibly inform the user (the driver) that the speed Vn of the present vehicle drops below the lower side limit vehicle speed (the lowest control-enabling vehicle speed) Vlimit, and hence the inter-vehicle distance control is canceled.

Figure 9:
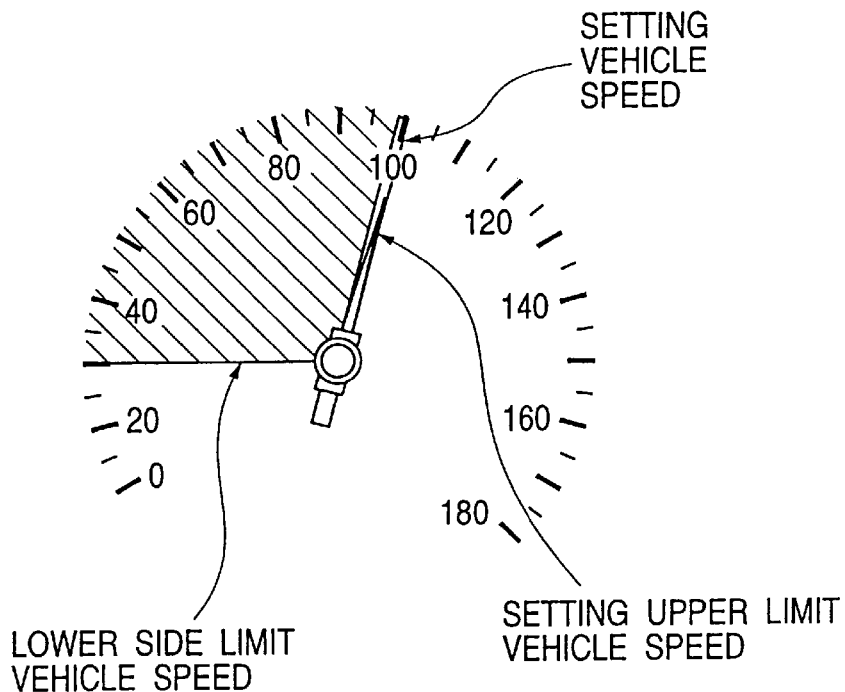

FIG. 9 shows a merit provided by the designing where the setting vehicle speed Vm and the setting upper limit vehicle speed Vmax are simultaneously displayed on the indictor device 14. In the case where the accelerator switch 12f among the cruise control switches 12 is actuated, the setting vehicle speed Vm is gradually increased from that shown in FIG. 4 and the indication bar gradually rotates clockwise toward the setting upper limit vehicle speed Vmax. The acceleration control is implemented to equalize the speed Vn of the present vehicle to the setting vehicle speed Vm. Therefore, the pointer which denotes the speed Vn of the present vehicle rotates clockwise and follows the indication bar representative of the setting vehicle speed Vm.

In this case, since it is easy to compare the setting upper limit vehicle speed Vmax and the setting vehicle speed Vm denoted by the indication bar, the user (the driver) can be effectively prevented from continuing to actuate the accelerator switch 12f although the setting vehicle speed Vm has already reached the setting upper limit vehicle speed Vmax.

In the case where the present vehicle is controlled to follow a preceding vehicle and the indicator device 14 is in the condition of FIG. 5, when the accelerator switch 12f is actuated, the speed Vn of the present vehicle and the setting vehicle speed Vm are varied as follows. The speed Vn of the present vehicle repetitively rises and drops independently of the actuation of the accelerator switch 12f due to the inter-vehicle distance control. On the other hand, the setting vehicle speed Vm is increased in response to the actuation of the accelerator switch 12f. At this time, since it is easy to compare the setting upper limit vehicle speed Vmax and the setting vehicle speed Vm denoted by the indication bar, the user (the driver) can be effectively prevented from continuing to actuate the accelerator switch 12f although the setting vehicle speed Vm has already reached the setting upper limit vehicle speed Vmax.

Preferably, the computer 4 controls the indicator device 14 to visually or audibly inform when the setting vehicle speed Vm reaches the setting upper limit vehicle speed Vmax as a result of the actuation of the accelerator switch 12f by the user (the driver).

Figure 15:
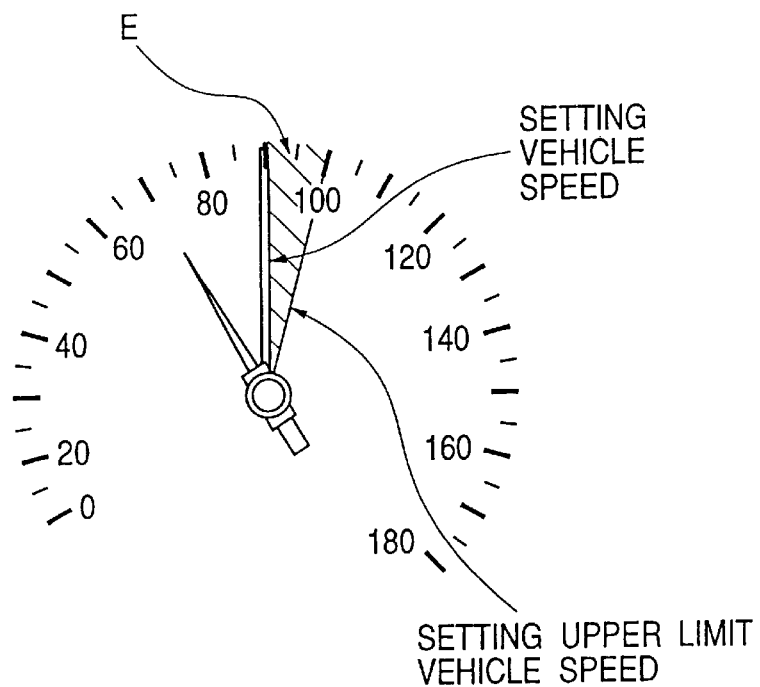

FIG. 15 shows a condition of the front surface of the indicator device 14 in which the sectorial region "E" corresponding to the difference between the setting upper limit vehicle speed Vmax and the setting vehicle speed Vm is positively indicated in such a way as to be visually distinguished from other regions. According to the condition of the indicator device 14 in FIG. 15, it is easily understand what speed range the setting vehicle speed Vm can be increased by.

Figure 10:
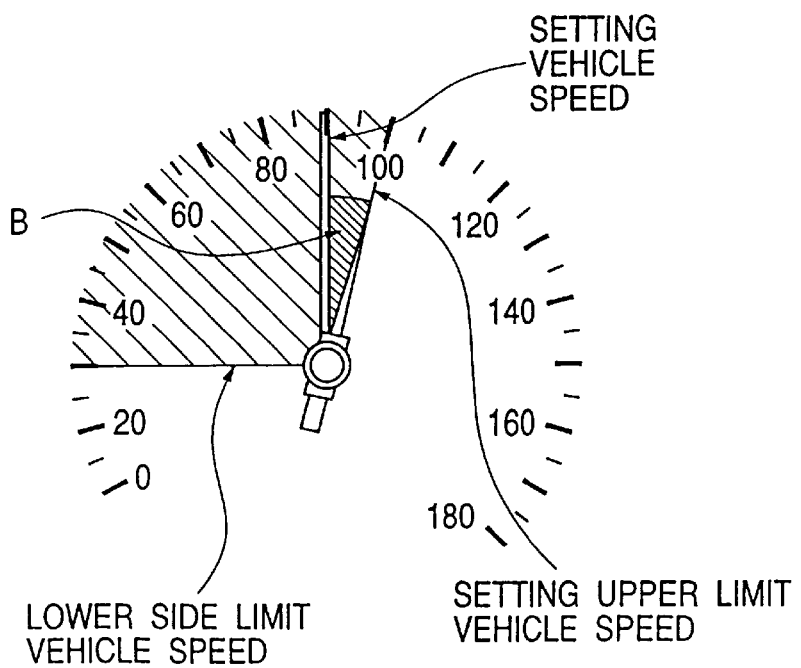

FIG. 10 shows a condition of the front surface of the indicator device 14 which occurs when the driver depresses the accelerator pedal and the speed Vn of the present vehicle exceeds the setting vehicle speed Vm (override). In the case where the speed Vn of the present vehicle increases to 100 km/h above a setting vehicle speed of 90 km, it is possible to clearly understand, from the positional difference between the pointer and the indication bar, how much the speed Vn of the present vehicle has been increased. In FIG. 10, the sectorial region "B" corresponding to the difference between the setting vehicle speed Vm and the speed Vn of the present vehicle is positively indicated in such a way as to be visually distinguished from other regions. Thus, it is easy to grasp what speed level the speed Vn of the present vehicle will be decreased to.

Figure 11:
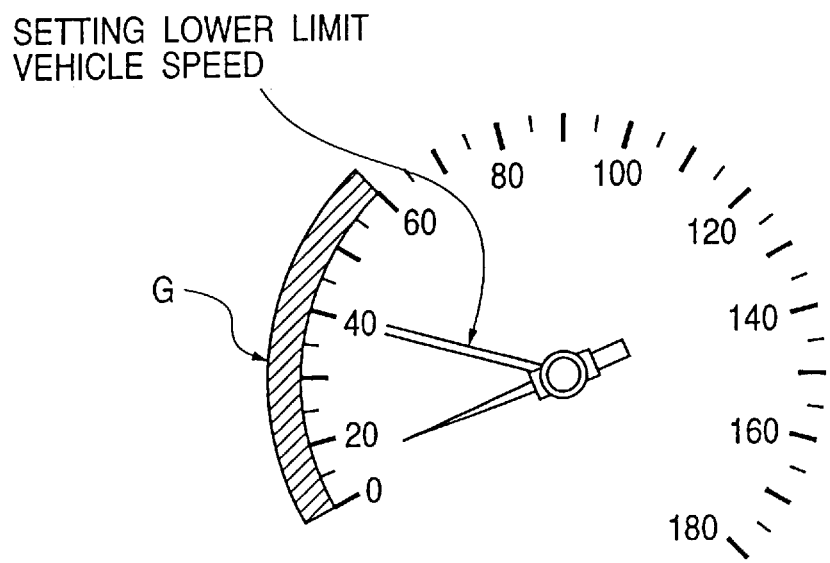
Figure 12:
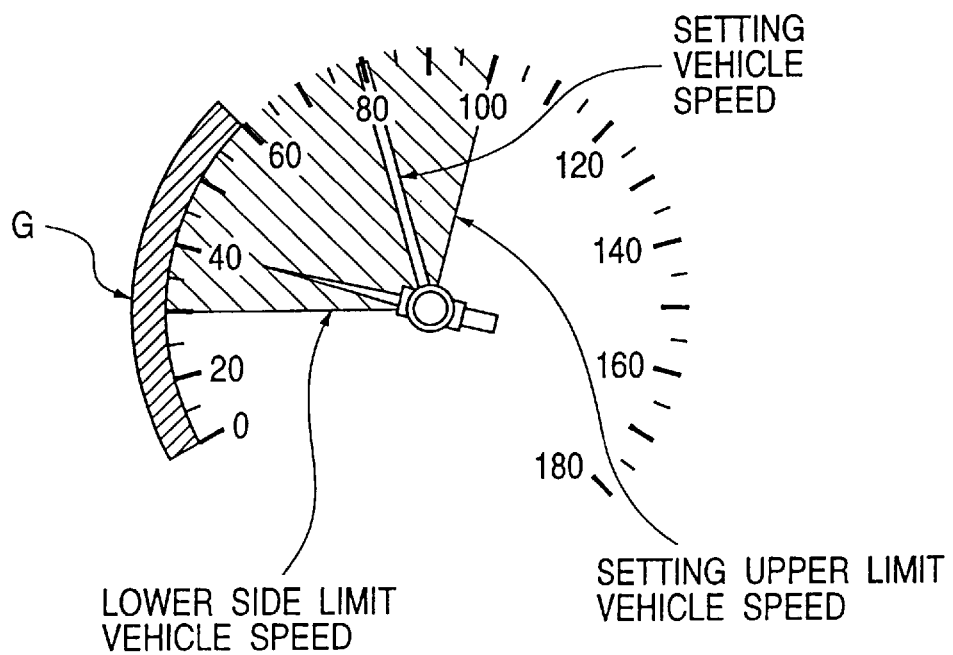

The automatic cruise control system 1 may communicate with a navigation system (not shown). The automatic cruise control system 1 fetches limit vehicle speed information from a database in the navigation system. The limit vehicle speed information represents a limit vehicle speed range (for example, a legal limit vehicle speed range). The computer 4 controls the indicator device 14 so that the limit vehicle speed range and the speed Vn of the present vehicle will be displayed in a same indicator region on a contradistinction basis when the main switch 12a is in its ON position. FIG. 11 shows a condition of the front surface of the indicator device 14 in which the circumferential region "G" corresponding to a limit vehicle speed range of 0 to 60 km/h is positively indicated in such a way as to be visually distinguished from other regions. According to the condition of the indicator device 14 in FIG. 11, it is possible to reliably prevent the setting vehicle speed Vm from being placed outside the limit vehicle speed range. Generally, the condition of the indicator device 14 in FIG. 11 occurs before the start of the cruise control. The condition of the indicator device 14 in FIG. 11 displays the limit vehicle speed range and the speed Vn of the present vehicle on a contradistinction basis. FIG. 12 shows a condition of the front surface of the indicator device 14 which occurs immediately after a high limit vehicle speed range is replaced by a low limit vehicle speed range during the inter-vehicle distance control. According to the condition of the indicator device 14 in FIG. 12, it is possible to inform the driver (the user) that the setting vehicle speed Vm is excessively high. Generally, the condition of the indicator device 14 in FIG. 12 occurs after the cruise control has been started. The condition of the indicator device 14 in FIG. 12 displays the limit vehicle speed range, the speed Vn of the present vehicle, and the setting vehicle speed Vm on a contradistinction basis.

The navigation system reads out link information from a recording medium such as a CD-ROM or a DVD, and implements a given navigation process in response to the link information. The limit vehicle speed information may be stored in the recording medium together with the link information. In the case of a VICS (vehicle information and communication system) navigation system, limit vehicle speed information can be fetched from an external VICS center through communication therewith. Alternatively, limit vehicle speed information may be obtained through communication with another information sensor or sensors.

Figure 13:
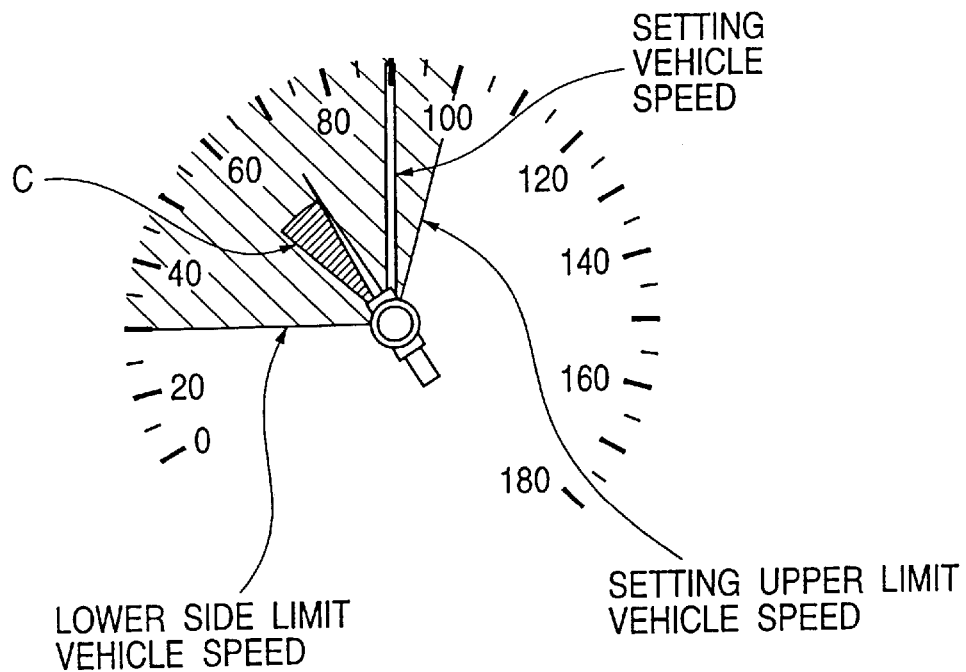

FIG. 13 shows a condition of the front surface of the indicator device 14 which occurs when the speed Vn of the present vehicle is increasing. In FIG. 13, the sectorial region "C" extending in a counterclockwise side of the Vn pointer is positively indicated in such a way as to be visually distinguished from other regions. Specifically, the sectorial region "C" is different from other regions in color or brightness. The sectorial region "C" has an area depending on and corresponding to a target acceleration value. The target acceleration value may be replaced by a target torque output of the engine. According to the condition of the indicator device 14 in FIG. 13, it is easily understand that the present vehicle is being accelerated.

Figure 14:
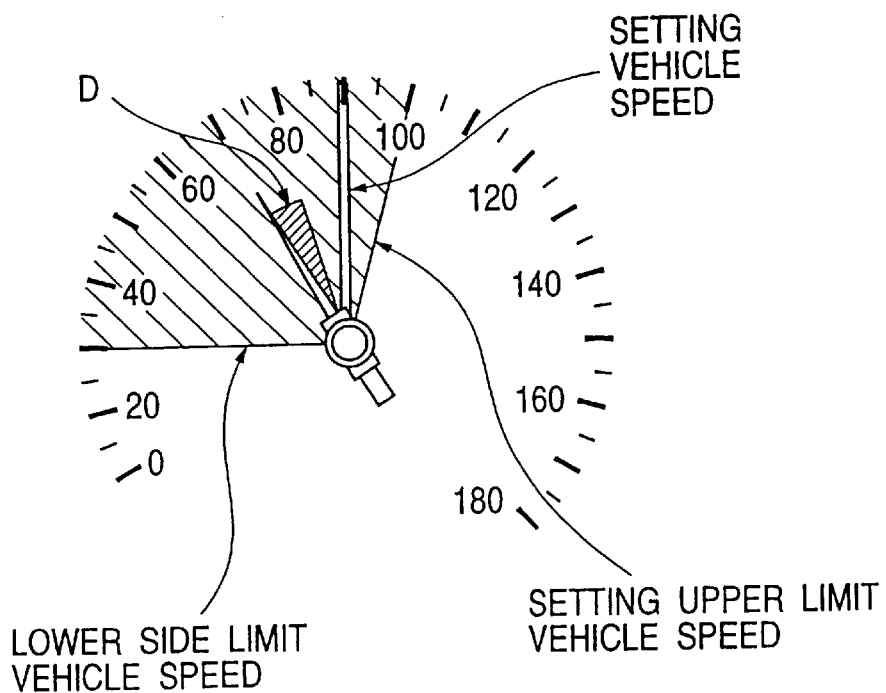

FIG. 14 shows a condition of the front surface of the indicator device 14 which occurs when the speed Vn of the present vehicle is decreasing. In FIG. 14, the sectorial region "D" extending in a clockwise side of the Vn pointer is positively indicated in such a way as to be visually distinguished from other regions. Specifically, the sectorial region "D" is different from other regions in color or brightness. The sectorial region "D" has an area depending on and corresponding to a target deceleration value. The target deceleration value may be replaced by a target torque output of the engine. According to the condition of the indicator device 14 in FIG. 14, it is easily understand that the present vehicle is being decelerated.

During the execution of the inter-vehicle distance control, the present vehicle is sometimes accelerated or decelerated at a small degree. It is difficult for the driver to sense such a small degree of acceleration or deceleration. Thus, in this case, the driver hardly decides whether or not the inter-vehicle distance control is normally implemented from a feeling of acceleration or deceleration. According to the conditions of the indicator device 14 in FIGS. 13 and 14, the sectorial regions "C" and "D" denote the directions of movement of the pointer denoting the speed Vn of the present vehicle. It is possible to decide whether or not the inter-vehicle distance control is normally implemented from the sectorial regions "C" and "D". Furthermore, it is possible to predict the degree of a future change in the behavior of the present vehicle from the area of the sectorial region "C" or "D". The actual vehicle speed is changed with respect to a target acceleration by the control of the throttle valve and the brake actuators. There is an inevitable control delay regarding the occurrence of a change in the actual vehicle speed. In some cases, the driver tends to be dissatisfied with the control delay. The previously-mentioned prediction of the behavior of the present vehicle can compensate for the driver's dissatisfaction with the control delay. In the case where the driver desires a prompt deceleration of the present vehicle with respect to a preceding control object (a preceding vehicle), the driver is sometimes dissatisfied with a delay of the start of the deceleration control. In this case, since the sectorial region "D" denotes a target deceleration value, the driver can predict that the present vehicle will soon be decelerated. Thus, it is possible to compensate for the driver's dissatisfaction.

Second Embodiment

A second embodiment of this invention is similar to the first embodiment thereof except that the indicator device 14 is of a digital meter type. In this case, the speed of the present vehicle and the magnitudes of other vehicle speeds may be denoted by the positions of active indicator lamps or the numbers of active indicator lamps. Alternatively, the speed of the present vehicle and other vehicle speeds may be directly represented by numerals. In this case, it is preferable that a change in the relation of the speed of the present vehicle with the other vehicle speeds is displayed as a color difference.

Third Embodiment

A third embodiment of this invention is similar to the first embodiment thereof except that the indicator device 14 audibly notifies at least one of the speed Vn of the present vehicle, the setting vehicle speed Vm, the setting upper limit vehicle speed Vmax, the setting lower limit vehicle speed Vmin, the lower side limit vehicle speed Vlimit, and the relations between these speeds.

Fourth Embodiment

A fourth embodiment of this invention is similar to the first embodiment thereof except that the indicator device 14 audibly notifies the difference between the setting vehicle speed Vm and the speed Vn of the present vehicle. Specifically, the indicator device 14 generates sound whose pressure level varies stepwise as a function of the difference between the setting vehicle speed Vm and the speed Vn of the present vehicle. Alternatively, the indicator device 14 may generate a train of pulses of sound whose duty cycle varies stepwise as a function of the difference between the setting vehicle speed Vm and the speed Vn of the present vehicle. According to the fourth embodiment of this invention, in the absence of a preceding control object (a preceding vehicle), it is easy to predict what speed level the present vehicle will be accelerated to.

Fifth Embodiment

A fifth embodiment of this invention is similar to the first embodiment thereof except that the indicator device 14 visually or audibly informs when the main switch 12a or the set switch 12b is changed to its ON position. According to the fifth embodiment of this invention, the driver (the user) can reliably understand that the cruise control has been started or the start of the cruise control has been prepared.

What is claimed is:

1. An informing apparatus for a cruise control system having a function of inter-vehicle control for enabling a present vehicle to follow a preceding vehicle, the informing apparatus comprising:
    first means for determining whether or not the inter-vehicle control is executed; and
    second means for indicating a degree of a target control amount for the inter-vehicle control in a form corresponding to a speed of the present vehicle when it is determined that the inter-vehicle control is executed.

2. An informing apparatus for a cruise control system having at least one of a function of inter-vehicle control for enabling a present vehicle to follow a preceding vehicle and a function of constant-speed travel control for enabling the present vehicle to travel at a constant speed, the informing apparatus comprising:

first means for determining whether or not cruise control is executed; and second means for indicating a setting vehicle speed and a lower side limit vehicle speed on a contradistinction basis when it is determined that the cruise control is executed, the setting vehicle speed being for the constant-speed travel control, the lower side limit vehicle speed denoting a lower limit speed for automatically suspending the cruise control.

3. An informing apparatus as recited in claim 2, further comprising means for indicating a difference between the setting vehicle speed and the lower side limit vehicle speed as a two-dimensional region.

4. An informing apparatus for a cruise control system having a function of constant-speed travel control for enabling a present vehicle to travel at a constant speed, the informing apparatus comprising:

first means for determining whether or not a setting vehicle speed for the constant-speed travel control is provided;

second means for determining whether or not the constant-speed travel control is executed; and third means for indicating the setting vehicle speed and a setting upper limit vehicle speed on a contradistinction basis when it is determined that the setting vehicle speed is provided and the constant-speed travel control is executed, the setting upper limit vehicle speed denoting an upper limit of a vehicle speed range in which the constant-speed travel control is enabled.

5. An informing apparatus as recited in claim 4, further comprising means for indicating a difference between the setting vehicle speed and the setting upper limit vehicle speed as a two-dimensional region.

6. An informing apparatus for a cruise control system having at least one of a function of inter-vehicle control for enabling a present vehicle to follow a preceding vehicle and a function of constant-speed travel control for enabling the present vehicle to travel at a constant speed, the informing apparatus comprising:

first means for determining whether or not cruise control is executed; and second means for indicating a speed of the present vehicle and a lower side limit vehicle speed on a contradistinction basis when it is determined that the cruise control is executed, the lower side limit vehicle speed denoting a lower limit speed for automatically suspending the cruise control.

7. An informing apparatus as recited in claim 6, further comprising means for visually or audibly informing when the speed of the present vehicle becomes equal to the lower side limit vehicle speed.

8. An informing apparatus as recited in claim 6, further comprising means for indicating a difference between the lower side limit vehicle speed and the speed of the present vehicle as a two-dimensional region.

9. An informing apparatus for a cruise control system having at least one of a function of inter-vehicle control for enabling a present vehicle to follow a preceding vehicle and a function of constant-speed travel control for enabling the present vehicle to travel at a constant speed, the informing apparatus comprising:

first means for determining whether or not a main switch is in its ON position, the main switch being for setting a state in which the cruise control system can start to operate;

second means for determining whether or not a set switch is in its OFF position, the set switch being for commanding execution of cruise control; and third means for indicating a speed of the present vehicle and a setting lower limit vehicle speed on a contradistinction basis when it is determined that the main switch is in its ON position while the set switch is in its OFF position, the setting lower limit vehicle speed denoting a lower limit of a vehicle speed range in which the cruise control is enabled.

10. An informing apparatus as recited in claim 9, wherein the cruise control system executes the inter-vehicle control in the presence of a preceding vehicle being a control object, and executes the constant-speed travel control in the absence of a preceding vehicle being a control object.

11. An informing apparatus as recited in claim 9, further comprising means for indicating a difference between the setting lower limit vehicle speed and the speed of the present vehicle as a two-dimensional region.

12. An informing apparatus as recited in claim 9, further comprising means for visually or audibly informing when it is determined that at least one of the main switch and the set switch is changed to its ON position.

13. An informing apparatus for a cruise control system having a function of constant-speed travel control for enabling a present vehicle to travel at a constant speed, the informing apparatus comprising:

first means for determining whether or not a setting vehicle speed for the constant-speed travel control is provided;

second means for determining whether or not the constant-speed travel control is executed; and third means for indicating a difference between a speed of the present vehicle and the setting vehicle speed as a two-dimensional region when it is determined that the setting vehicle speed is provided and the constant-speed travel control is executed.

14. An informing apparatus as recited in claim 13, further comprising means for generating a sound or a train of pulses of sound when it is determined that the setting vehicle speed is provided and the constant-speed travel control is executed, wherein the generated sound has a sound pressure which varies stepwise as a function of the difference between the setting vehicle speed and the speed of the present vehicle, and the train of pulses of sound has a duty cycle which varies stepwise as a function of the difference between the setting vehicle speed and the speed of the present vehicle.

15. An informing apparatus as recited in claim 13, further comprising means for visually or audibly informing when the speed of the present vehicle becomes equal to the setting vehicle speed or when the speed of the present vehicle is equal to the setting vehicle speed.

16. An informing apparatus as recited in claim 15, further comprising means for varying the setting vehicle speed in response to changing operation by a user, and means for visually or audibly informing when the setting vehicle speed reaches a setting upper limit vehicle speed, the setting upper limit speed being an upper limit of a vehicle speed range in which cruise control is enabled.

17. An informing apparatus as recited in claim 13, further comprising means for deriving information of a limit vehicle speed, means for indicating the limit vehicle speed information and the speed of the present vehicle on a contradistinction basis before cruise control is started, and means for indicating the limit vehicle speed information, the speed of the present vehicle, and the setting vehicle speed on a contradistinction basis after cruise control has been started.

18. An informing apparatus as recited in claim 17, further comprising means for obtaining the limit vehicle speed information from a navigation system.

* * * * *